United States Patent
Kim et al.

(10) Patent No.: US 10,909,412 B2
(45) Date of Patent: Feb. 2, 2021

(54) ELECTRONIC DEVICE AND CONTROL METHOD THEREOF

(71) Applicant: Samsung Electronics Co., Ltd., Suwon-si (KR)

(72) Inventors: Raetae Kim, Suwon-si (KR); Kyunghoon Cha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 169 days.

(21) Appl. No.: 16/276,436

(22) Filed: Feb. 14, 2019

(65) Prior Publication Data

US 2019/0251388 A1 Aug. 15, 2019

(30) Foreign Application Priority Data

Feb. 14, 2018 (KR) .................. 10-2018-0018722

(51) Int. Cl.
*G06K 9/52* (2006.01)
*G06K 9/46* (2006.01)
*G06K 9/00* (2006.01)
*G06F 3/0484* (2013.01)

(52) U.S. Cl.
CPC ........... *G06K 9/52* (2013.01); *G06K 9/00228* (2013.01); *G06K 9/4652* (2013.01); *G06K 9/4661* (2013.01); *G06F 3/0484* (2013.01)

(58) Field of Classification Search
CPC .... G06K 9/52; G06K 9/4652; G06K 9/00228; G06K 9/4661; G06K 9/3216; G06K 2209/03; G06K 9/22; G06F 3/0484; G06F 1/1626; G06F 1/1637; G06F 3/04845; G06F 1/1686; G09G 2340/045; G09G 2340/14; G09G 2310/0281; G09G 5/00
See application file for complete search history.

(56) References Cited

U.S. PATENT DOCUMENTS

| 9,645,663 B2 | 5/2017 | Mavrody |
| 2014/0310643 A1 | 10/2014 | Karmanenko et al. |
| 2016/0111040 A1 | 4/2016 | Kim et al. |

(Continued)

FOREIGN PATENT DOCUMENTS

| CN | 105629596 A | 6/2016 |
| EP | 3336671 A1 | 6/2018 |

(Continued)

OTHER PUBLICATIONS

ISA/KR, "International Search Report and Written Opinion of the International Searching Authority," International Application No. PCT/KR2019/001757, dated May 21, 2019, 12 pages.

*Primary Examiner* — Marcos L Torres

(57) ABSTRACT

An electronic device includes: a display having a notch portion formed on at least one edge thereof, a processor; and a memory configured to store at least one of a position, a size, or a color of a region corresponding to the notch portion, wherein the memory is configured to store instructions that cause the processor to identify an image characteristic of a non-display region of an image that is not displayed by the region corresponding to the notch portion when receiving a user command requesting displaying of the image, and to control the display according to the image characteristic to adjust a region displaying the image and to display the image. Other embodiments are possible.

20 Claims, 10 Drawing Sheets

(56) References Cited

U.S. PATENT DOCUMENTS

| | | |
|---|---|---|
| 2016/0364602 A1 | 12/2016 | Kim et al. |
| 2018/0335908 A1 | 11/2018 | Kim et al. |
| 2019/0107943 A1* | 4/2019 | Daioku .................... G09G 5/14 |
| 2019/0281154 A1* | 9/2019 | Choi .................... G06F 3/0488 |
| 2019/0325809 A1* | 10/2019 | Yang .................... G09G 3/2092 |

FOREIGN PATENT DOCUMENTS

| | | |
|---|---|---|
| KR | 10-1677956 B1 | 11/2016 |
| KR | 10-2016-0144851 A | 12/2016 |
| KR | 10-2017-0059201 A | 5/2017 |
| KR | 10-2017-0069696 A | 6/2017 |
| WO | 2017075511 A1 | 5/2017 |

\* cited by examiner

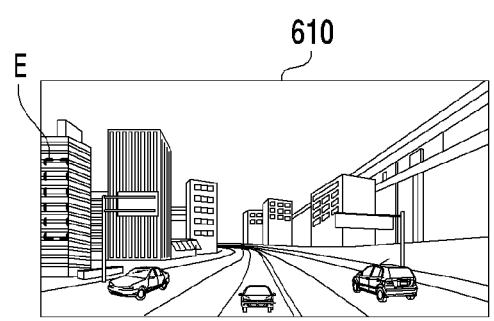
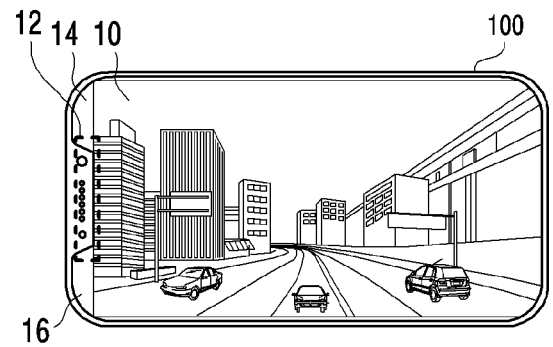
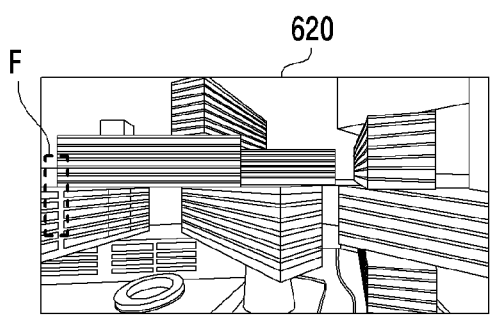
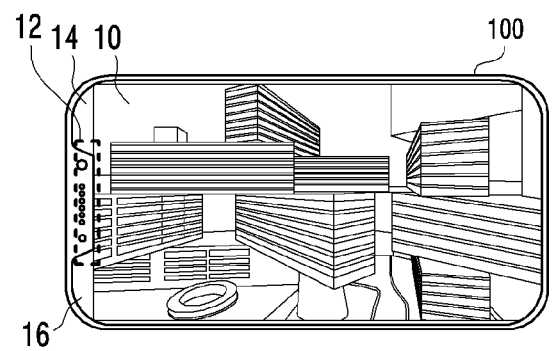
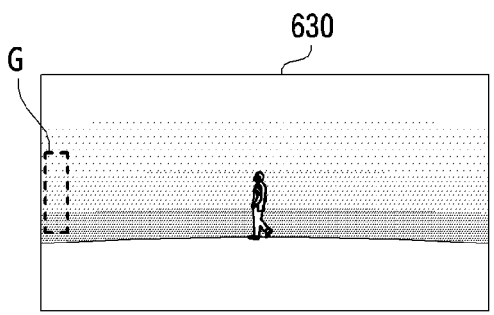
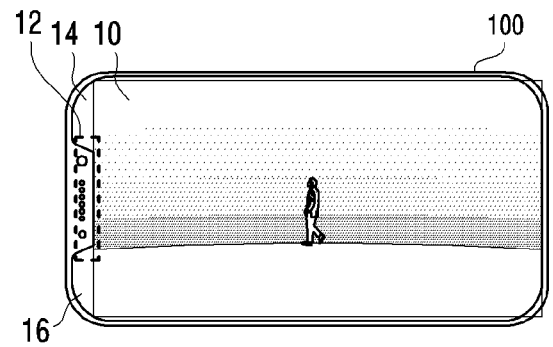
FIG.6A                    FIG.6B

ELECTRONIC DEVICE AND CONTROL METHOD THEREOF

CROSS-REFERENCE TO RELATED APPLICATION

This application is based on and claims priority under 35 U.S.C. § 119 to Korean Patent Application No. 10-2018-0018722, filed on Feb. 14, 2018, in the Korean Intellectual Property Office, the disclosure of which is incorporated by reference herein in its entirety.

BACKGROUND

1. Field

Various embodiments of the present disclosure relate to an electronic device which displays an image on a display, and more particularly, to an electronic device which differently implements an image display method according to a shape of a display.

2. Description of Related Art

As functions of portable electronic devices (for example, smartphones, tablet personal computers (PCs), or the like) are becoming more diversified in recent years, electronic devices basically including an image photographing function and an image reproduction function are being widely distributed.

An electronic device may photograph an image by using a camera module mounted therein, or may display an image, and may display images received from other electronic devices.

The above information is presented as background information only to assist with an understanding of the present disclosure. No determination has been made, and no assertion is made, as to whether any of the above might be applicable as prior art with regard to the present disclosure.

SUMMARY

Recent electronic devices are becoming slimmer, but electronic devices provided with a display having a notch portion formed on one edge to maximize use of one surface of the electronic device, departing from a normalized display shape, in order to satisfy users' needs for seeing various contents including images on a large screen, are coming into the market.

That is, an electronic device having a speaker, a sensor, or the like disposed in a region formed by a notch portion of the display on one surface of the electronic device, and using the other region for the display is coming into the market. In this case, when an image in a rectangular shape is displayed on the display having the notch portion, some region of the image may not be displayed, which may cause inconvenience.

According to various embodiments, an electronic device includes: a display having a notch portion formed on at least one edge thereof; a processor; and a memory configured to store at least one of a position, a size, or a color of a region corresponding to the notch portion, wherein the memory is configured to store instructions that cause the processor to identify an image characteristic of a non-display region of an image that is not displayed by the region corresponding to the notch portion when receiving a user command requesting displaying of the image, and to control the display according to the image characteristic to adjust a region displaying the image and to display the image.

According to various embodiments, a control method includes: receiving a user command requesting displaying of an image; identifying an image characteristic of a non-display region of the image that is not displayed by a region corresponding to a notch portion; and adjusting a region displaying the image according to the identified image characteristic, and displaying the image.

According to an embodiment of the present disclosure, the electronic device can display an image in consideration of an image characteristic of a region of the image that is not displayed by a notch portion formed on the display.

According to an embodiment of the present disclosure, the electronic device can display an image in consideration of a size and a position of a notch portion formed on the display.

According to an embodiment of the present disclosure, the electronic device can display images reproduced in sequence in consideration of a characteristic of a region that is not displayed by a notch portion.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6A and 6B are views illustrating a situation in which the electronic device according to an embodiment displays images in sequence;

DETAILED DESCRIPTION

Figure 1:
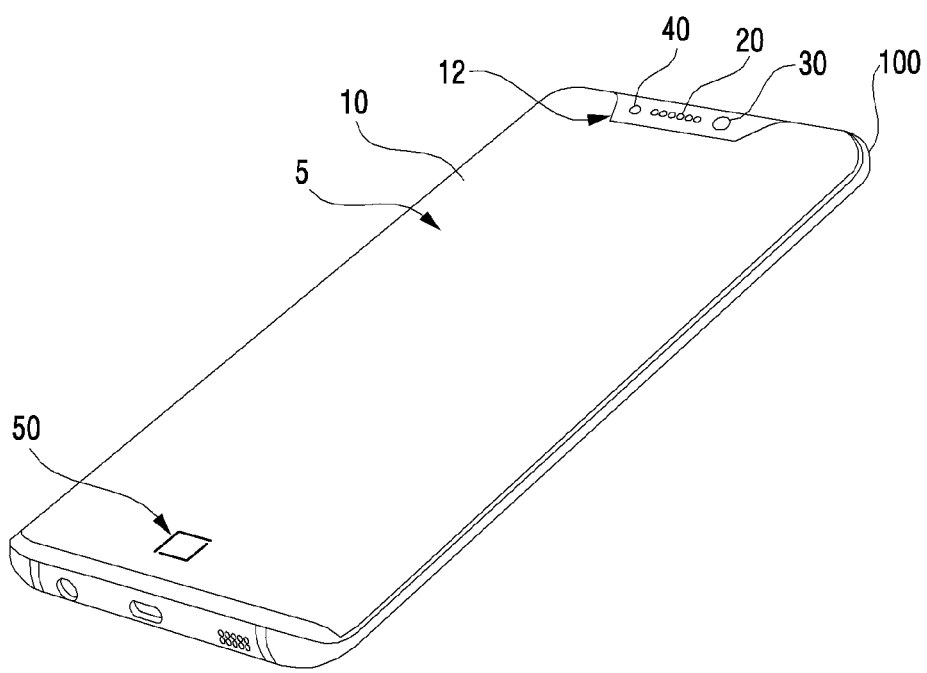
FIG. 1 is a view illustrating a schematic exterior of an electronic device according to an embodiment.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

An electronic device according to various embodiments of the present disclosure may include various types of electronic devices. The electronic device may include at least one of, for example, a portable communication device (e.g., a smartphone), a computer device, a portable multimedia device, a portable medical device, a camera, a wearable device, or a home appliance. The electronic device according to an embodiment is not limited to the above-described devices.

It should be appreciated that various embodiments of the present disclosure and the terms used therein are not intended to limit the technological features set forth herein to particular embodiments, and include various changes, equivalents, and/or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and/or B," "A, B, or C," or "at least one of" "A, B, and/or C" may include all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly or via a third element.

Hereinafter, various embodiments of the present disclosure will be described with reference to the accompanying drawings.

FIG. 1 is a view illustrating a schematic exterior of an electronic device according to an embodiment.

Referring to FIG. 1, the electronic device 100 may be implemented by using devices for various purposes. For example, the electronic device 100 may be implemented, but not limited to, by a mobile phone, a smartphone, a notebook computer, a tablet device, a wearable device, or the like as described above.

Referring to FIG. 1, a display 10 may be disposed on a front surface 5 of the electronic device 100. The display 10 may formed in the form of a touch screen overlapping a touch panel. According to an embodiment, the display 10 may include a curved surface. A speaker 20 may be positioned on an upper side of the display 10 to output an audio signal. A home key 50 may be positioned on a lower side of the display in the form of a soft key. However, the shape of the home key 50 implemented as a soft key is not limited thereto. The display 10 may include a display region for displaying a content (for example, a user interface, an image, a video, a text, an icon, or the like).

According to an embodiment, the electronic device 100 may have components mounted on the periphery of the speaker 20 to perform various functions.

According to an embodiment, the components may include at least one sensor module 40. For example, the components may include at least one of an illuminance sensor (for example, a light sensor), a proximity sensor, an infrared sensor, and an ultrasonic sensor. According to an embodiment, the components may include a camera (or a camera module 30). According to an embodiment, the components may include a light emitting diode (LED) indicator for notifying a user of state information of the electronic device 100.

According to an embodiment, the display 10 may include a notch portion 12 formed on at least one edge thereof. According to an embodiment, the speaker 20, the at least one sensor module 40, the camera 30, or the like described above may be positioned in a space formed by the notch portion 12 of the display 10.

According to an embodiment, the electronic device 100 may further extend a region for providing information to the user due to the display 10 having the notch portion 12.

A position, a width, or number of a region corresponding to the notch portion 12, that is, some region of the front surface 5 of the electronic device 100 formed by the notch portion 12, is not limited to those illustrated in the drawings of the present disclosure. For example, the electronic device 100 may have a notch portion formed on a lower end of the display 10 and may have a home key in the form of a physical key. In addition, the position of the speaker 20 may be changed a side surface adjacent to the front surface 5 of the electronic device 100, such that the size of the notch portion 12 can be reduced.

According to an embodiment, the electronic device 100 may pre-store the position of the notch portion 12 formed on the display 10. Accordingly, the electronic device 100 may selectively use some regions of the display 10 positioned on the left and right sides of the notch portion 12 of the display 10.

Figure 2A:
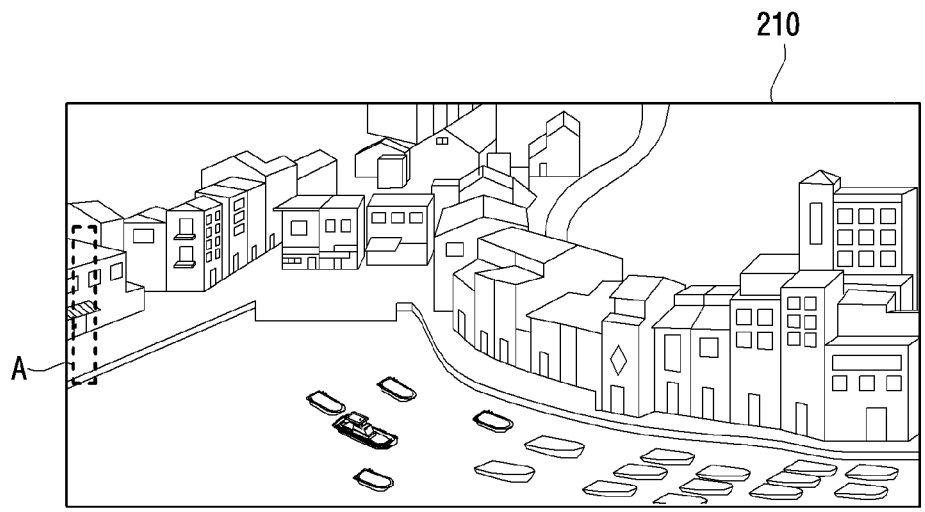
FIGS. 2A and 2B are views illustrating a situation in which the electronic device according to an embodiment displays an image by using a portion of a display in consideration of an image characteristic of a region of the image that may not be displayed by a notch portion formed on an edge of the display.
Figure 2B:
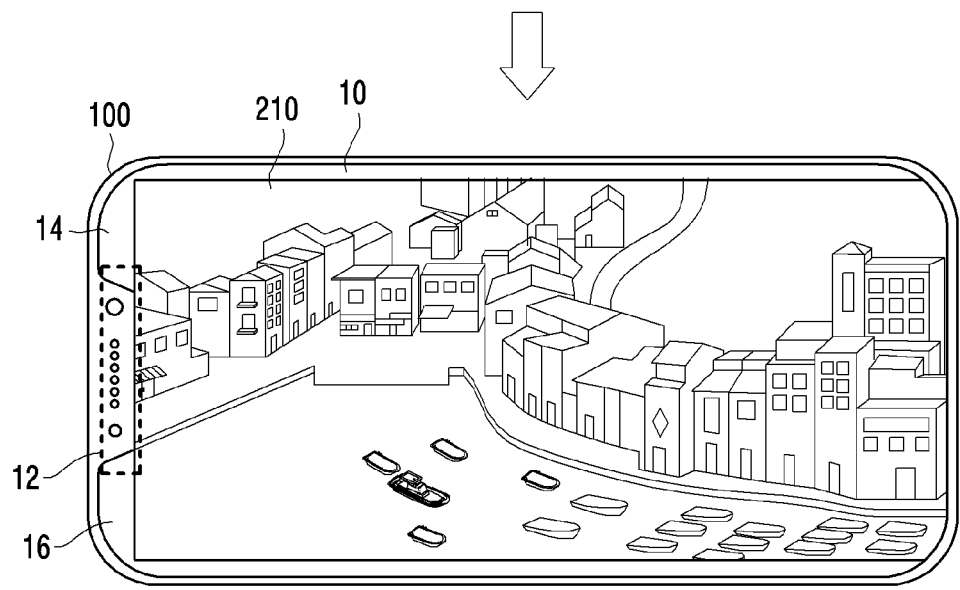

FIGS. 2A and 2B are views illustrating a situation in which the electronic device according to an embodiment displays an image by using a portion of the display in consideration of an image characteristic of a region of the image that may not be displayed by a region corresponding to the notch portion formed on an edge of the display.

FIG. 2A illustrates an image 210 to be displayed by the electronic device 100. When a user's command requesting displaying of the image 210 is received, the electronic device 100 may display the image 210 of FIG. 2A on the display 10. In this case, the image may include a still image, a moving image, or the like.

According to an embodiment, the electronic device 100 may display various images on the display 10 according to a user's request. For example, the electronic device 100 may display an image pre-stored in a memory of the electronic device 100 on the display 10. The electronic device 100 may display, on the display 10, an image received from an external device connected therewith via a communication network. In addition, the electronic device 100 may display an image inputted through a camera (for example, the camera 30 of FIG. 1) included in the electronic device 100 on the display 10.

Referring to FIG. 2B, the electronic device 100 may identify an image characteristic while displaying the image.

According to an embodiment, the image characteristic may be a result of analyzing the image. For example, the image characteristic may be at least one of an edge component extraction value of the image, a detection of an object from the image, a detection of a face from the image, and a color value of the image.

According to an embodiment, the electronic device 100 may use a detection value of an edge component detect from some region or an entire region of the image as the image characteristic.

An edge in the image may refer to a portion of the image existing at a point where brightness of the image changes from a lower value to a higher value or vice versa. Accordingly, the electronic device may extract a boundary between objects in the image, that is, an edge, simply by finding a portion where a difference in a brightness value is the greatest from the image.

According to an embodiment, the electronic device 100 may extract an edge component of the image by using the Sobel edge extraction algorithm, the Prewitt edge extraction algorithm, a Roberts edge extraction algorithm or the like. However, the edge extraction algorithm is not limited thereto.

According to an embodiment, the electronic device 100 may use an object or person's face detected from the image as the image characteristic.

The electronic device 100 may detect an object or person's face included in the image by the above-described edge extraction algorithm.

For example, the electronic device 100 may detect an edge of the image by using the above-described edge detection algorithm, and may detect various types of objects or persons' faces from the shape of the detected edge.

According to an embodiment, the electronic device 100 may recognize an object or a face by using an artificial intelligence (AI) algorithm. The electronic device 100 may detect an object or a face by applying a newly photographed image or a newly inputted image to a learning model, which is trained by using images including various types of objects or faces.

According to an embodiment, the electronic device 100 may use a color value detected from some region or entire region of the image as the image characteristic. According to an embodiment, the electronic device 100 may use, as the image characteristic, a result of comparing a color of the region corresponding to the predetermined notch portion 12, and a color value which is detected from a certain region of the image displayed on a region adjacent to the region corresponding to the notch portion 12 (for example, left and right display regions of the region corresponding to the notch portion 12 or a lower end display region of the region corresponding to the notch portion 12).

According to various embodiments, the color value may refer to a red value, a green value, and a blue value which are classified into 0 to 255 levels. To identify similar colors, each of different colors may be classified into a red value, a green value, and a blue value, and the different colors may be identified as being similar when a difference in each of the red values, the green values, and the blue values between the different colors is less than 20 levels. However, a criterion for determining similarity in color is not limited thereto, and similarity in color may be determined according to various criteria.

According to various embodiments, the electronic device 100 may use a result of comparing color values in a first region and a second region included in the image as the image characteristic.

Referring to FIG. 2B, when the electronic device 100 displays the image 210, the electronic device 100 may identify an image characteristic of a region of the image 210 that may not be displayed by the region corresponding to the notch portion 12 of the display 10.

According to an embodiment, the notch portion 12 of the display 10 may be positioned on at least one edge of the display 10 as described above with reference to FIG. 1. The display 10 formed to have a curve on at least one edge thereof as described above may be referred to as a notch display.

When the electronic device 100 displays the image by using the display 10 having the notch portion 12, there may be a non-display region in the image that is not displayed by the region corresponding to the notch portion 12. The electronic device 100 according to an embodiment may identify the above-described image characteristic regarding the non-display region of the image that is not displayed by the region corresponding to the notch portion 12. The electronic device 100 may adjust a region of the display 10 that displays the image according to the identified image characteristic.

Referring to FIGS. 2A and 2B, when the electronic device 100 displays the image 210 by using the entire region of the display 10 having the notch portion 12, an A region may not be displayed by the region corresponding to the notch portion 12.

The electronic device 100 according to an embodiment may identify an image characteristic regarding the A region of the image 210 which may not be displayed by the region corresponding to the notch portion 12.

According to an embodiment, the electronic device 100 may use an edge detection value of the A region as the image characteristic. The electronic device 100 may detect an edge component from the A region by using various edge detection algorithms described above. The A region may include a window, a door, or the like, and the electronic device 100 may detect a plurality of edge components from the A region. In this case, the electronic device 100 may identify the A region as a meaningful region, and may display the image 210 by using some region of the display.

According to various embodiments, the electronic device 100 may use color values of the A region and a periphery adjacent to the A region. The electronic device 100 may identify the color values of the A region and the periphery adjacent to the A region, and may compare the color values with the color of the region corresponding to the notch portion 12. In this case, the color of the region corresponding to the notch portion 12 may be pre-stored in the memory of the electronic device 100. When the color values of the A region and the periphery adjacent to the A region are not similar to the color of the region corresponding to the notch portion 12, the electronic device 100 may display the image 210 by using some region of the display 10.

Referring to FIG. 2B, the electronic device 100 described above may display the image by using some region of the display 10. For example, the electronic device 100 may reduce a size of a region displaying the image 210 on the display 10, and may not display the image 210 on regions of the display 10 positioned on the left and right sides 14, 16 of the region corresponding to the notch portion 12.

As described above, the electronic device 100 according to an embodiment may set the function of displaying an image in consideration of a region corresponding to the notch portion 12 formed on the display 10 as one mode or option for reproducing an image. Accordingly, a user may selectively apply this function to an image display function of the electronic device 100.

Figures 3A, 3B:
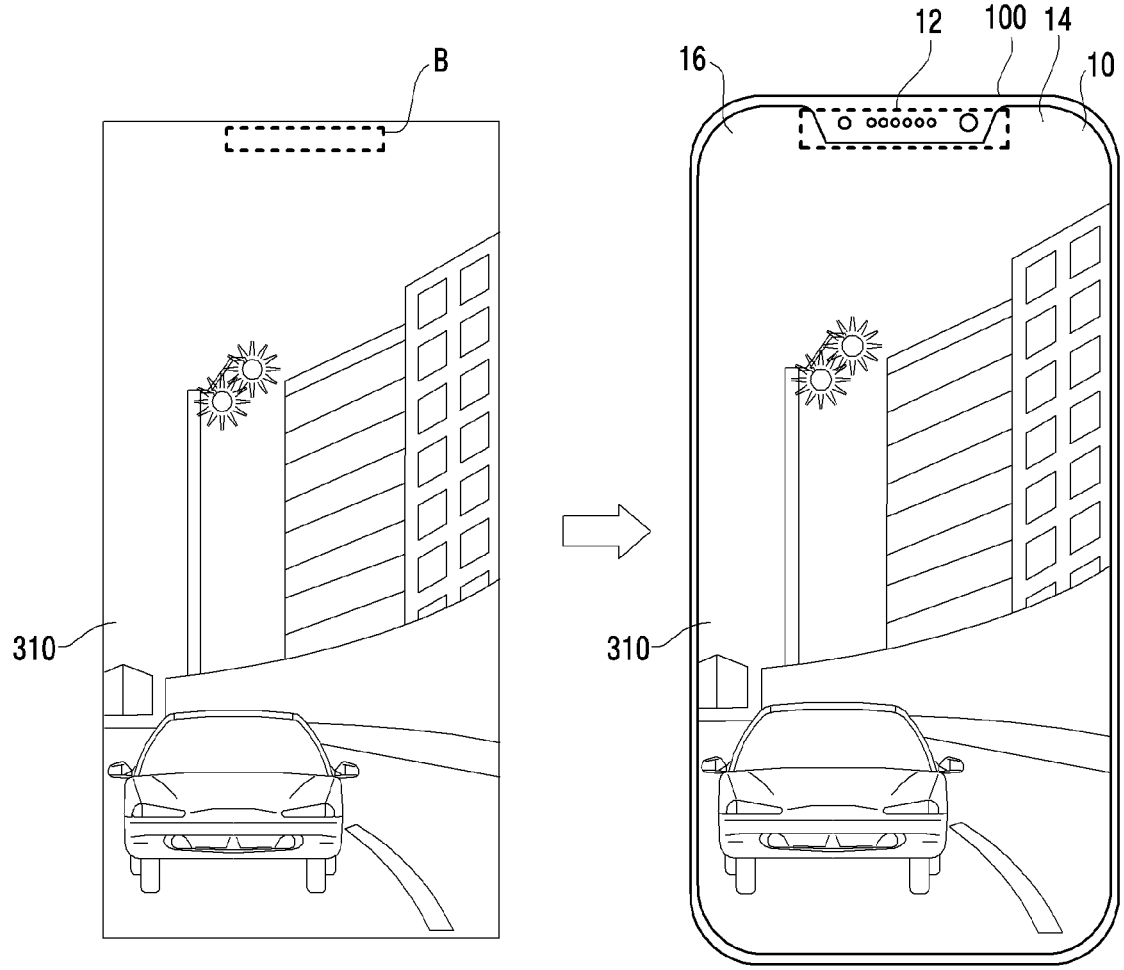
FIGS. 3A and 3B are views illustrating a situation in which the electronic device according to an embodiment displays an image by using an entire display in consideration of an image characteristic of a region of the image that may not be displayed by the notch portion included in the display.

FIGS. 3A and 3B are views illustrating a situation in which the electronic device according to an embodiment displays an image by using the entire display in consideration of an image characteristic of a region of the image that may not be displayed by a region corresponding to the notch portion included in the display.

FIG. 3A illustrates an image 310 to be displayed by the electronic device 100. When a user's command requesting displaying of the image 310 is received, the electronic device 100 may display the image 310 of FIG. 3A on the display 10.

According to an embodiment, the electronic device 100 may display an image pre-stored in the memory, images received from external electronic devices, or an input inputted through a camera (for example, the camera 30 of FIG. 1) on the display according to a user's request.

Referring to FIG. 3B, the electronic device 100 may identify an image characteristic of a region of the image corresponding to the notch portion 12 of the display 10.

According to an embodiment, the image characteristic may be a result of analyzing the image. For example, the image characteristic may be at least one of an edge component extraction value of the image, a detected object, a detected face, and a color value of the image.

According to an embodiment, the notch portion 12 of the display 10 may be positioned on at least one edge of the display 10 as described above with reference to FIG. 1.

When the electronic device 100 displays the image by using the entire region of the display 10 having the notch portion 12, some region of the image may not be displayed by the region corresponding to the notch portion 12. The electronic device 100 according to an embodiment may identify the above-described image characteristic regarding a non-display region of the image that may not be displayed by the region corresponding to the notch portion 12. The electronic device 100 may adjust the region of the display 10 displaying the image according to the identified image characteristic.

Referring to FIGS. 3A and 3B, when the electronic device 100 displays the image by using the entirety of the display 10, a B region may not be displayed by the region corresponding to the notch portion 12.

The electronic device 100 according to an embodiment may identify an image characteristic regarding the region of the image 310 that may not be displayed by the region corresponding to the notch portion 12.

According to an embodiment, the electronic device 100 may use an edge detection value of the B region as the image characteristic. The electronic device 100 may detect an edge component from the B region by using the above-described various edge detection algorithms. Since there is no great difference in colors of the B region, a plurality of edge components may not be detected from the B region. In this case, the electronic device 100 may not identify the B region as a meaningful region, and may display the image 310 by using the entire region of the display 10.

According to various embodiments, the electronic device 100 may use color values of the B region and a periphery adjacent to the B region. The electronic device 100 may identify the color values of the B region and the periphery adjacent to the B region, and may compare the color values with a color of the region corresponding to the notch portion 12. When the color values of the B region and the periphery adjacent to the B region are similar to the color of the region corresponding to the notch portion 12, the electronic device 100 may display the image 310 by using the entire region of the display 10.

Referring to FIG. 3B, the electronic device 100 may display the image by using the entire display region of the display 10.

FIGS. 4A to 4D are views illustrating a situation in which the electronic device according to an embodiment displays an image according to a holding posture of the electronic device.

Referring to FIGS. 4A to 4D, the electronic device 100 according to an embodiment may display an image differently according to whether the display 10 is positioned in the portrait orientation or in the landscape orientation.

For example, when an image is photographed by the electronic device 100 held in the vertical direction, and the image is reproduced with the display 10 being positioned in the portrait orientation, the electronic device 100 may display the photographed image by using the entire region of the display 10. In addition, when an image is photographed by the electronic device 100 held in the vertical direction, and the image is reproduced with the display 10 being positioned in the landscape orientation, the electronic device 100 may display the photographed image by using some region of the display 10 in order to display the whole image photographed in the vertical direction.

Figure 4A:
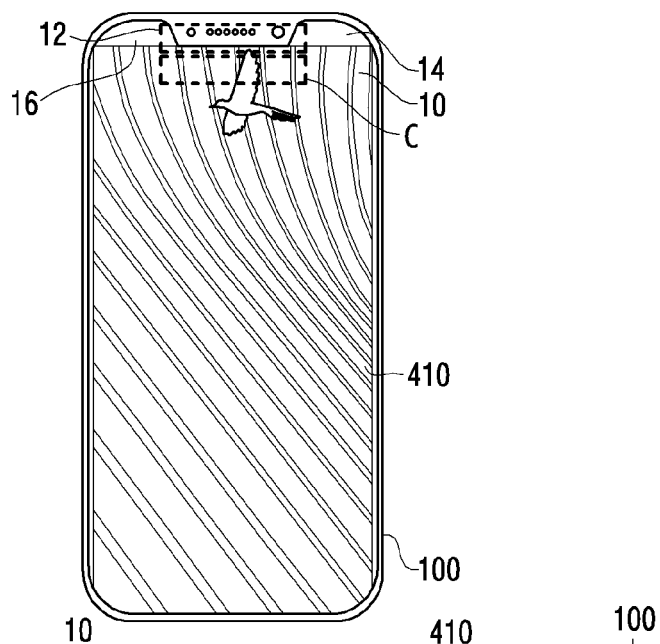
FIGS. 4A to 4D are views illustrating a situation in which the electronic device according to an embodiment displays an image according to its holding posture.

Referring to FIG. 4A, when the electronic device 100 displays an image, the electronic device 100 may identify an image characteristic of a region of the image that may not be displayed by a region corresponding to the notch portion 12 of the display 10.

According to an embodiment, the image characteristic may be a result of analyzing the image. For example, the image characteristic may be at least one of an edge component extraction value of the image, a detected object, a detected face, and a color value of the image.

Referring to FIG. 4A, when the electronic device 100 displays the image 410 by using the entirety of the display 10, a C region may not be displayed by the region corresponding to the notch portion 12.

The electronic device 100 according to an embodiment may identify an image characteristic of a non-display region of the image 410 that may not be displayed by the notch portion 12.

The electronic device 100 according to an embodiment may detect an object from the C region. For example, the electronic device 100 may detect an edge component from the C region by using the above-described edge detection algorithm, and then may detect an object (for example, a bird's wing) according to a shape of the edge.

The electronic device 100 according to various embodiments may detect the object (for example, a bird's wing) from the C region by using an AI algorithm.

In this case, the electronic device 100 according to an embodiment may identify the C region as a meaningful region, and may display the image 410 by using some region of the display 10. For example, the electronic device 100 may reduce the size of the region displaying the image 410 on the display 10, and may not display the image 410 on some sides 14, 16 of the display 10 positioned on the left and right sides of the region corresponding to the notch portion 12.

Figure 4B:
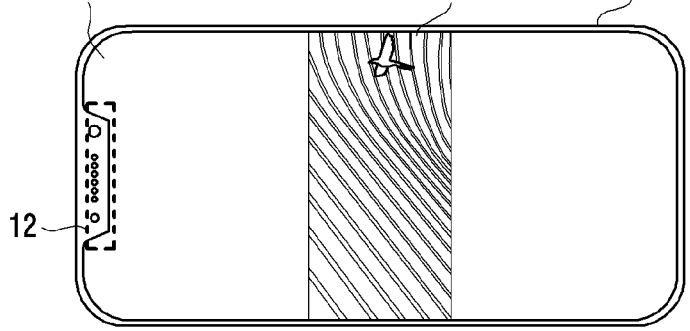

Referring to FIG. 4B, when the electronic device 100 displays the image, the electronic device 100 may identify an image characteristic of a region of the image that corresponds to the notch portion 12 of the display 10.

According to an embodiment, when the electronic device 100 held in the horizontal direction displays the image 410 which is photographed in the vertical direction, the electronic device 100 may display the image 410 on some region of the display 10 in order to display the whole image 410.

In this case, the electronic device 100 may display the image 410 regardless of the notch portion 12 of the display 10.

Figure 4C:
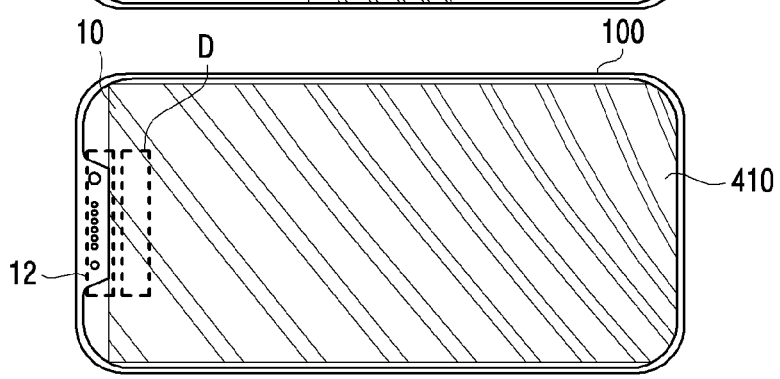

Referring to FIG. 4C, the electronic device 100 may zoom-in the image and display the image according to a user's input to zoom-in and display the image. In this case, the electronic device 100 may identify an image characteristic of a non-display region of the image 410 that may not be displayed by the region corresponding to the notch portion 12.

The electronic device 100 according to an embodiment may detect an edge from a D region adjacent to the notch portion 12 while zooming-in the image 410. For example, the electronic device 100 may detect the edge from the D region by using the above-described edge detection algorithm. Since there is no great difference in color of the D region, a plurality of edge components may not be detected from the D region.

Figure 4D:
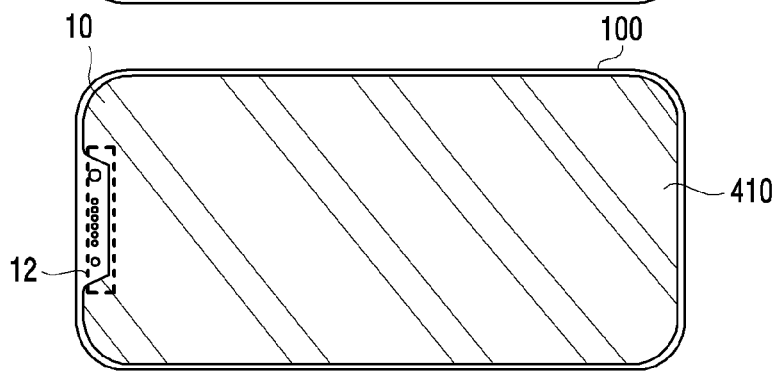

Referring to FIG. 4D, the electronic device 100 may not identify the D region as a meaningful region, and may display the image 410 by using the entirety of the display 10.

Figures 5A, 5B:
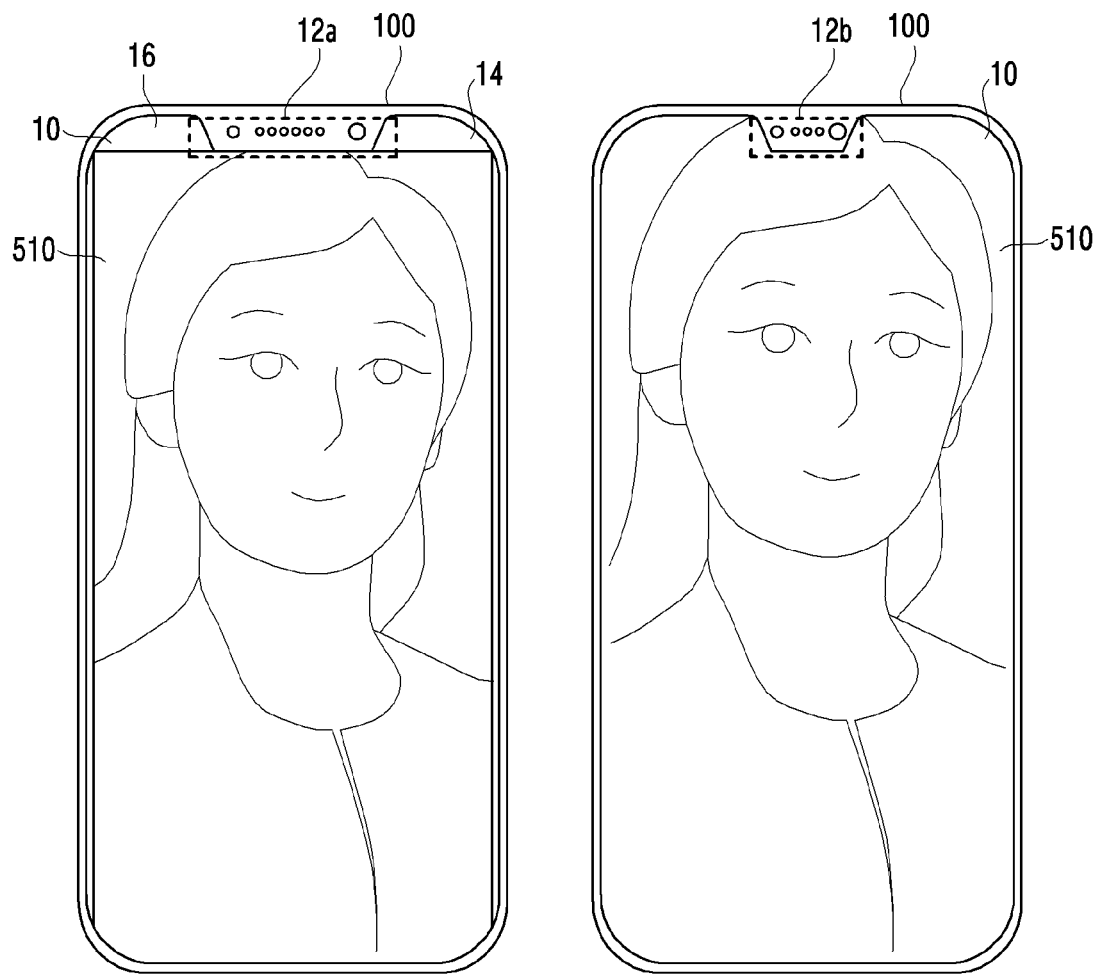
FIGS. 5A and 5B are views illustrating a situation in which the electronic device according to an embodiment displays an image according to a size of a notch portion formed on the display.

FIGS. 5A and 5B are views illustrating a situation in which the electronic device according to an embodiment displays an image according to a size of a region corresponding to a notch portion formed on the display of the electronic device.

Referring to FIGS. 5A and 5B, the electronic device 100 may pre-store a shape and a size of a region corresponding to the notch portion 12. The electronic device 100 may set a different display method for the same image according to the shape and the size of the region corresponding to the notch portion 12.

According to an embodiment, when the electronic device 100 displays an image 510, the electronic device 100 may identify an image characteristic of a non-display region of the image 510 that may not be displayed by the region corresponding to the notch portion 12 of the display 10.

According to an embodiment, the image characteristic may be a result of analyzing the image. For example, the image characteristic may be at least one of an edge component extraction value of the image, a detected object, a detected face, and a color value of the image.

Referring to FIGS. 5A and 5B, the electronic device 100 according to an embodiment may compare a color of the region corresponding to the notch portion 12 and a color value of some region of the image adjacent to the notch portion 12, and may utilize the result of comparing as the image characteristic. In this case, the electronic device 100 may pre-store the color of the region corresponding to the notch portion 12.

Referring to FIG. 5A, some region of the image adjacent to the notch portion 12a may include a person's head and a background. The electronic device 100 may identify that the head and the background have different colors, and the color of the background is different from the color of the region corresponding to the notch portion 12a.

Accordingly, the electronic device 100 may identify the region adjacent to the notch portion 12a as a meaningful region, and may display the image 510 by using some region of the display 10. For example, the electronic device 100 may reduce the size of the region displaying the image on the display 10, and may not display the image 510 on regions of the display 10 positioned on the left and right sides 14, 16 of the region corresponding to the notch portion 12a.

Referring to FIG. 5B, a portion of the image adjacent to the notch portion 12b may include a persons' head. The electronic device 100 may identify that the color of the head is similar to the color of the region corresponding to the notch portion 12b.

Accordingly, the electronic device 100 may not identify the region adjacent to the notch portion 12b as a meaningful region, and may display the image 510 by using the entire region of the display 10.

FIGS. 6A and 6B are views illustrating a situation in which the electronic device according to an embodiment displays images in sequence.

The electronic device 100 according to an embodiment may display a plurality of images on the display 10 in sequence according to a user input requesting a sequence image display.

Referring to FIG. 6A, the electronic device 100 may receive a user's input to display a first image 610, a second image 620, and a third image 630 in sequence. In this case, the terms "first," "second," and "third" do not mean a sequence, and may be interpreted as distinguishing the plurality of images. The electronic device 100 may display the images 610, 620, 630 on the display 10 in response to the user input requesting displaying of the images 610, 620, 630 of FIG. 6A in sequence. In this case, the electronic device 100 may identify an image characteristic of a non-display region that may not be displayed by the region corresponding to the notch portion 12 while displaying the images 610, 620, 630 on the display 10.

Referring to FIG. 6A, when the electronic device 100 displays the images 610, 620, 630 by using the entirety of the display 10, an E region, an F region, and a G region may not be displayed by the region corresponding to the notch portion 12.

The electronic device 100 according to an embodiment may identify image characteristics of the regions (E, F, G regions).

The electronic device 100 according to an embodiment may use edge detection values of the regions (E, F, G regions) as the image characteristics. The electronic device 100 may detect edge components from the regions (E, F, G regions) by using various edge detection algorithms.

Since the E region and the F region include buildings or etc., the electronic device 100 may detect a plurality of edge components from the E region and the F region. In this case, the electronic device 100 may identify the E region and the F region as meaningful regions.

Since the G region includes a portion of the sky with many clouds, a plurality of edge components may not be detected from the G region. In this case, the electronic device 100 may not identify the G region as a meaningful region.

Referring to FIG. 6B, when a meaningful region is included in the regions (E, F, G regions) that may not be displayed by the region corresponding to the notch portion 12, the electronic device 100 may display the images 610, 620, 630 in sequence by using some region of the display 10. For example, the electronic device 100 may reduce the size of the region displaying the images 610, 620, 630 on the display 10, and may not display the images 610, 620, 630 on regions of the display 10 positioned on the left and right sides 14, 16 of the region corresponding to the notch portion 12.

However, this should not be considered as limiting. According to various embodiments, the electronic device 100 may display the images 610, 620, 630 in sequence in other methods.

For example, when the electronic device 100 displays the images 610, 620 including the E region, the F region, the electronic device 100 may display the images 610, 620 by using some region of the display 10. In addition, when the electronic device 100 displays the image 630 including the G region, the electronic device 100 may display the image 630 by using the entire region of the display 10.

Figure 7:
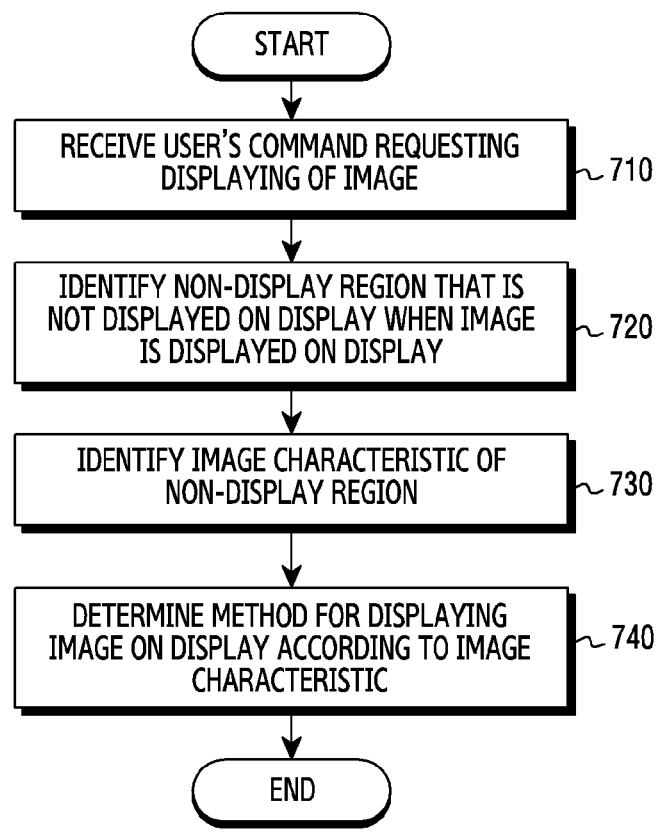
FIG. 7 is a flowchart illustrating a situation in which an electronic device according to an embodiment displays an image in consideration of an image characteristic of a region of the image that may not be displayed by a notch portion formed on an edge of a display.

FIG. 7 is a flowchart illustrating a situation in which the electronic device according to an embodiment displays an image in consideration of an image characteristic of a region of the display that may not be displayed by a region corresponding to the notch portion formed on an edge of the display.

In operation 710, the electronic device 100 may receive a user's command requesting displaying of an image.

In operation 720, the electronic device 100 may identify a non-display region that is not displayed by the region corresponding to the notch portion, while displaying the image on the display. According to an embodiment, the electronic device 100 may pre-store a size and a position of the region corresponding to the notch portion. The electronic device 100 may distinguish between a landscape orientation of the display and a portrait orientation of the display, and may identify the non-display region.

In operation 730, the electronic device 100 may identify an image characteristic of the non-display region. The electronic device 100 according to an embodiment may identify at least one of, for example, an edge component extraction value of the image, a detected object, a detected face, a color value of the image as the image characteristic.

In operation 740, the electronic device 100 may determine a method for displaying the image on the display according to the identified image characteristic. For example, the electronic device 100 may display the image by using some region of the display or using the entire region of the display.

Figure 8:
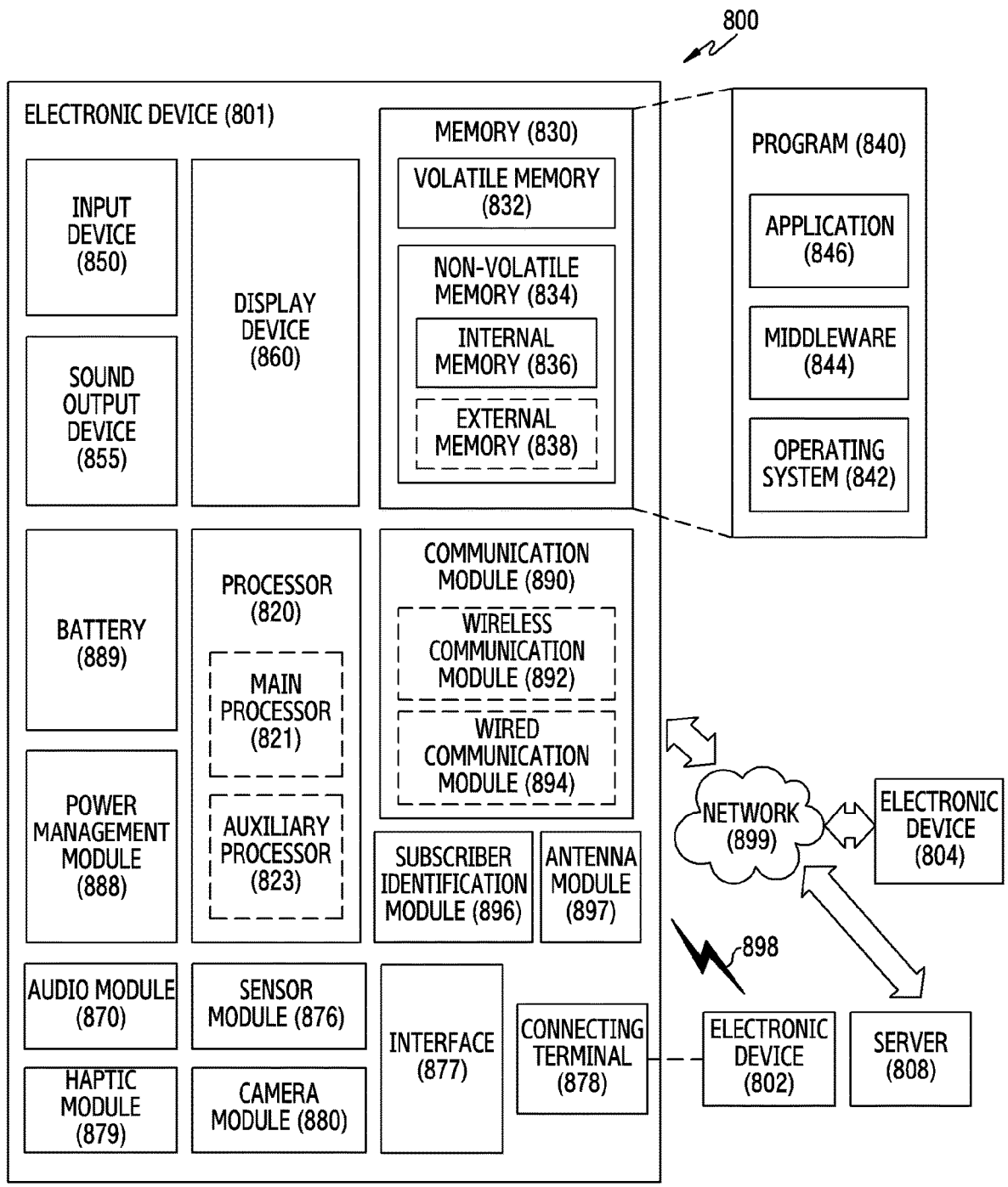
FIG. 8 is a block diagram illustrating an electronic device in a network environment according to various embodiments.

FIG. 8 is a block diagram of an electronic device 801 in a network environment 800 according to various embodiments. The electronic device 801 may include the electronic device 100 of FIG. 1. Referring to FIG. 8, the electronic device 801 in the network environment 800 may communicate with an electronic device 802 via a first network 898 (e.g., a short-range wireless communication network), or an electronic device 804 or a server 808 via a second network 899 (e.g., a long-range wireless communication network). According to an embodiment, the electronic device 801 may communicate with the electronic device 804 via the server 808. According to an embodiment, the electronic device 801 may include a processor 820, memory 830, an input device 850, a sound output device 855, a display device 860, an audio module 870, a sensor module 876, an interface 877, a haptic module 879, a camera module 880, a power management module 888, a battery 889, a communication module 890, a subscriber identification module (SIM) 896, or an antenna module 897. In some embodiments, at least one (e.g., the display device 860 or the camera module 880) of the components may be omitted from the electronic device 801, or one or more other components may be added in the electronic device 801. In some embodiments, some of the components may be implemented as single integrated circuitry. For example, the sensor module 876 (e.g., a fingerprint sensor, an iris sensor, or an illuminance sensor) may be implemented as embedded in the display device 860 (e.g., a display).

The processor 820 may execute, for example, software (e.g., a program 840) to control at least one other component (e.g., a hardware or software component) of the electronic device 801 coupled with the processor 820, and may perform various data processing or computation. According to one embodiment, as at least part of the data processing or computation, the processor 820 may load a command or data received from another component (e.g., the sensor module 876 or the communication module 890) in volatile memory 832, process the command or the data stored in the volatile memory 832, and store resulting data in non-volatile memory 834. According to an embodiment, the processor 820 may include a main processor 821 (e.g., a central processing unit (CPU) or an application processor (AP)), and an auxiliary processor 823 (e.g., a graphics processing unit (GPU), an image signal processor (ISP), a sensor hub processor, or a communication processor (CP)) that is operable independently from, or in conjunction with, the main processor 821. Additionally or alternatively, the auxiliary processor 823 may be adapted to consume less power than the main processor 821, or to be specific to a specified function. The auxiliary processor 823 may be implemented as separate from, or as part of the main processor 821.

The auxiliary processor 823 may control at least some of functions or states related to at least one component (e.g., the display device 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). According to an embodiment, the auxiliary processor 823 (e.g., an image signal processor or a communication processor) may be implemented as part of another component (e.g., the camera module 880 or the communication module 890) functionally related to the auxiliary processor 823. The memory 830 may store various data used by at least one component (e.g., the processor 820 or the sensor module 876) of the electronic device 801. The various data may include, for example, software (e.g., the program 840) and input data or output data for a command related thererto. The memory 830 may include the volatile memory 832 or the non-volatile memory 834.

The program 840 may be stored in the memory 830 as software, and may include, for example, an operating system (OS) 842, middleware 844, or an application 846.

The input device 850 may receive a command or data to be used by other component (e.g., the processor 820) of the electronic device 801, from the outside (e.g., a user) of the electronic device 801. The input device 850 may include, for example, a microphone, a mouse, or a keyboard.

The sound output device 855 may output sound signals to the outside of the electronic device 801. The sound output device 855 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 860 may visually provide information to the outside (e.g., a user) of the electronic device 801. The display device 860 may include, for example, a display, a hologram device, or a projector and control circuitry to control a corresponding one of the display, hologram device, and projector. According to an embodiment, the display device 860 may include touch circuitry adapted to detect a touch, or sensor circuitry (e.g., a pressure sensor) adapted to measure the intensity of force incurred by the touch.

The audio module 870 may convert a sound into an electrical signal and vice versa. According to an embodiment, the audio module 870 may obtain the sound via the input device 850, or output the sound via the sound output device 855 or a headphone of an external electronic device (e.g., an electronic device 802) directly (e.g., wired) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. According to an embodiment, the sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device (e.g., the electronic device 802) directly (e.g., wired) or wirelessly. According to an embodiment, the interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device (e.g., the electronic device 802). According to an embodiment, the connecting terminal 878 may include, for example, a HDMI connector, a USB connector, a SD card connector, or an audio connector (e.g., a headphone connector).

The haptic module 879 may convert an electrical signal into a mechanical stimulus (e.g., a vibration or a movement) or electrical stimulus which may be recognized by a user via his tactile sensation or kinesthetic sensation. According to an embodiment, the haptic module 879 may include, for example, a motor, a piezoelectric element, or an electric stimulator.

The camera module 880 may capture a still image or moving images. According to an embodiment, the camera module 880 may include one or more lenses, image sensors, image signal processors, or flashes.

The power management module 888 may manage power supplied to the electronic device 801. According to one embodiment, the power management module 888 may be implemented as at least part of, for example, a power management integrated circuit (PMIC).

The battery 889 may supply power to at least one component of the electronic device 801. According to an embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the application processor (AP)) and supports a direct (e.g., wired) communication or a wireless communication. According to an embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as BLUETOOTH, wireless-fidelity (Wi-Fi) direct, or infrared data association (IrDA)) or the second network 899 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 892 may identify and authenticate the electronic device 801 in a communication network, such as the first network 898 or the second network 899, using subscriber information (e.g., international mobile subscriber identity (LMSI)) stored in the subscriber identification module 896.

The antenna module 897 may transmit or receive a signal or power to or from the outside (e.g., the external electronic device) of the electronic device 801. According to an embodiment, the antenna module 897 may include one or more antennas, and, therefrom, at least one antenna appropriate for a communication scheme used in the communication network, such as the first network 898 or the second network 899, may be selected, for example, by the communication module 890 (e.g., the wireless communication module 892). The signal or the power may then be transmitted or received between the communication module 890 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 801 and the external electronic device 804 via the server 808 coupled with the second network 899. Each of the electronic devices 802 and 804 may be a device of a same type as, or a different type, from the electronic device 801. According to an embodiment, all or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, or client-server computing technology may be used, for example.

The electronic device according to an embodiment may include: a display having a notch portion formed on at least one edge thereof; a processor; and a memory configured to store at least one of a position, a size, or a color of a region corresponding to the notch portion, and the memory may store instructions that cause the processor to identify an image characteristic of a non-display region of an image that is not displayed by the region corresponding to the notch portion when receiving a user command requesting displaying of the image, and to control the display according to the image characteristic to adjust a region displaying the image and to display the image.

In the electronic device 100 according to an embodiment, the image characteristic may be at least one of an edge component detection value, a detected object, a detected face, or a color value.

In the electronic device 100 according to an embodiment, the memory may store instructions that cause the processor to: when at least a part of an object or a face is detected from the non-display region, control the display to display the image by using some region of the display; and, when at least a part of an object or face is not detected from the non-display region, control the display to display the image by using an entire region of the display.

In the electronic device 100 according to an embodiment, the memory may store instructions that cause the processor to: when a color of the non-display region is similar to a color of the region corresponding to the notch portion, control the display to display the image by using an entire region of the display; and, when the color of the non-display region is not similar to the color of the region corresponding to the notch portion, control the display to display the image by using some region of the display.

In the electronic device 100 according to an embodiment, the memory may store instructions that cause the processor to identify an image characteristic of the non-display region of the image that is not displayed by the region corresponding to the notch portion when a user command requesting zooming-in of the image displayed on the display is received, and the image is zoomed in, and to control the display according to the image characteristic to adjust a region displaying the zoomed-in image.

In the electronic device 100 according to an embodiment, the memory may store instructions that cause the processor to: when detection of at least a part of an object or a face from the non-display region is identified, control the display to zoom-in and display the image by using some region of the display; and, when detection of at least a part of an object or face from the non-display region is not identified, control the display to zoom-in and display the image by using an entire region of the display.

In the electronic device 100 according to an embodiment, the memory may store instructions that cause the processor to: when a similarity between a color of the non-display region and a color of the region corresponding to the notch portion is identified, control the display to zoom-in and display the image by using an entire region of the display; and, when the similarity between the color of the non-display region and the color of the region corresponding to the notch portion is not identified, control the display to zoom-in and display the image by using some region of the display.

In the electronic device 100 according to an embodiment, the memory may store instructions that cause the processor to, when a user command to display a plurality of images including a first image and a second image in sequence is received, identify an image characteristic of a non-display region of the first image that is not displayed by the region corresponding to the notch portion, and to control the display according to the image characteristic to adjust a region displaying the plurality of images and to display the plurality of images in sequence.

In the electronic device 100 according to an embodiment, the memory may store instructions that cause the processor to: when detection of at least a part of an object or face from the non-display region included in the first image is identified, control the display to display the plurality of images in sequence by using some region of the display; and, when detection of at least a part of an object or face from the non-display region included in the first image is not identified, control the display to display the plurality of images in sequence by using an entire region of the display.

In the electronic device 100 according to an embodiment, the memory may store instructions that cause the processor to: when a similarity between a color of the non-display region included in the first image and a color of the region corresponding to the notch portion is identified, control the display to display the plurality of images in sequence by using the entire region of the display; and, when the similarity between the color of the non-display region included in the first image and the color of the region corresponding to the notch portion is not identified, control the display to display the plurality of images in sequence by using a portion of the display.

Figure 9:
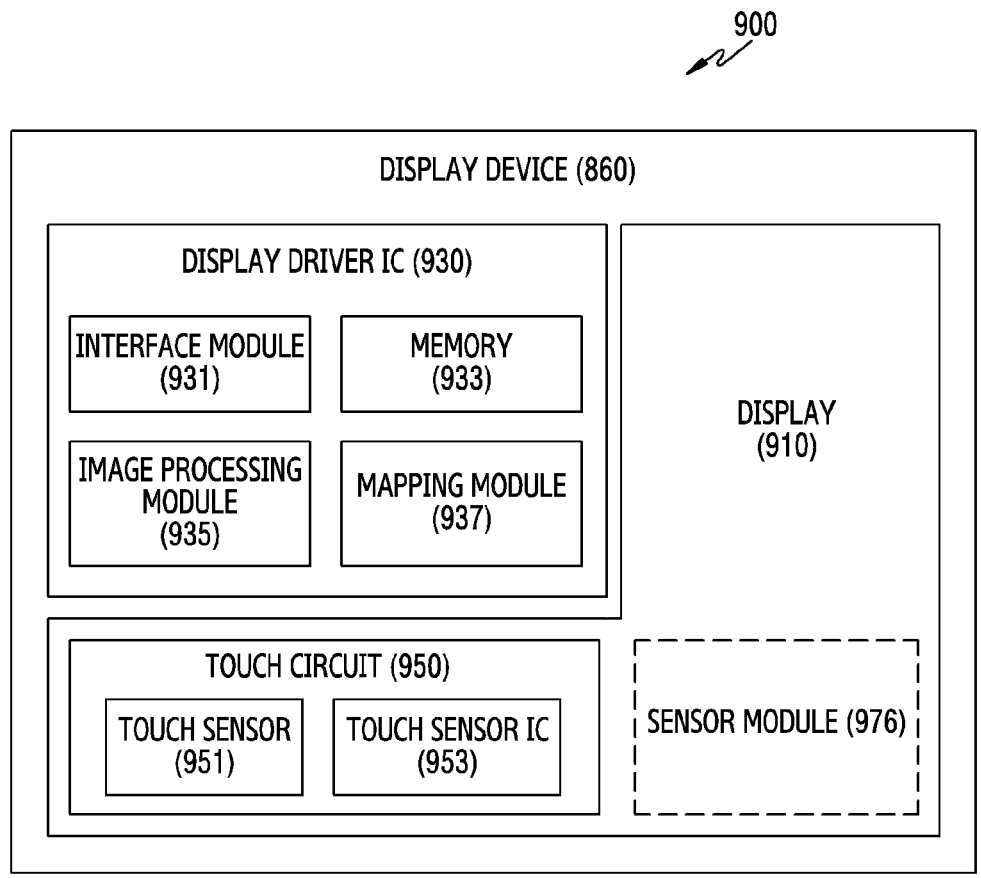
FIG. 9 is a block diagram illustrating a display device according to various embodiments.

FIG. 9 is a block diagram 900 of the display device 860 according to various embodiments. Referring to FIG. 9, the display device 860 may include a display 910 and a display driver IC (DDI) 930 for controlling the same. The DDI 930 may include an interface module 931, a memory 933 (for example, a buffer memory), an image processing module 935, or a mapping module 937. The DDI 930 may receive, from the processor 820 (for example, the main processor 821 (for example, an application processor) or the auxiliary processor 823 operating independently from the function of the main processor 821) through the interface module 931, image data or image information including an image control signal corresponding to a command for controlling the image data. The DDI 930 may communicate with a touch circuit 950 or a sensor module 976 through the interface module 931. In addition, the DDI 930 may store at least part of the received image information in the memory 933, for example, on a frame basis. The image processing module 935 may perform pre-processing or post-processing (for example, adjusting a resolution, brightness, or size) with respect at least part of the image data, based on at least a characteristic of the image data or a characteristic of the display 910. The mapping module 937 may convert the image data pre-processed or post-processed through the image processing module 935 into a voltage value or a current value capable of driving the pixels, based at least in part on an attribute (for example, arrangement of pixels (RGB stripe or pentile) or size of each of sub pixels) of the pixels of the display 910. At least some pixels of the display 910 may be driven based on the voltage value or current value, such that visual information (for example, a text, an image, or an icon) corresponding to the image data can be displayed on the display 910.

According to an embodiment, the display device 860 may further include the touch circuit 950. The touch circuit 950 may include a touch sensor 951 and a touch sensor IC 953 for controlling the same. The touch sensor IC 953 may control the touch sensor 951 to measure a change of a signal (for example, a voltage, an amount of light, a resistance, or a quantity of electric charge) regarding a specific position of the display 910 to detect a touch input or a hovering input regarding the specific position, and may provide information (for example, a position, an area, pressure, or time) regarding the detected touch input or hovering input to the processor 820. According to an embodiment, at least part (for example, the touch sensor IC 953) of the touch circuit 950 may be included as a part of the display driver IC 930 or the display 910, or a part of another element (for example, the auxiliary processor 823) disposed outside the display device 860.

According to an embodiment, the display device 860 may further include at least one sensor (for example, a fingerprint sensor, an iris sensor, a pressure sensor, or an illuminance sensor) of the sensor module 876 or a control circuit therefor. In this case, the at least one sensor or the control circuit therefor may be embedded in a part of the display device 860 (for example, the display 910 or the DDI 930), or a part of the touch circuit 950. For example, when the sensor module 876 embedded in the display device 860 includes a biometric sensor (for example, a fingerprint sensor), the biometric sensor may obtain biometric information (for example, a fingerprint image) associated with a touch input through some region of the display 910. In another example, when the sensor module 876 embedded in the display device 860 includes a pressure sensor, the pressure sensor may obtain pressure information regarding a touch input through a part of the display 910 or an entire region of the display 910. According to an embodiment, the touch sensor 951 or the sensor module 876 may be disposed between pixels of a pixel layer of the display 910 or above or under the pixel layer.

Figure 10:
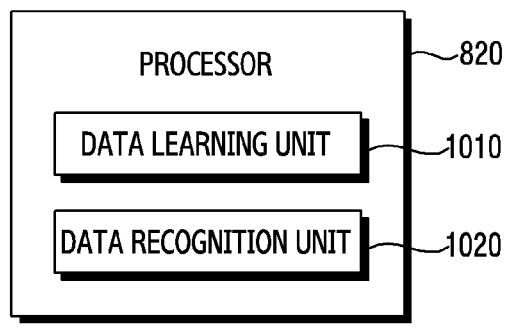
FIG. 10 is a block diagram illustrating a processor according to an embodiment.

FIG. 10 is a block diagram of a processor according to an embodiment.

Referring to FIG. 10, the processor 820 of the electronic device 100 according to an embodiment may include a data learning unit 1010 and a data recognition unit 1020.

The data learning unit 1010 may train a learning model for estimating an object to have a criterion for estimating an object included in an image. The data learning unit 1010 may learn a criterion regarding which training data will be used to estimate an object included in an image, or regarding whether an object included in an image is estimated by using training data. The data learning unit 1010 may obtain training data to be used for training, and may estimate an object included in an image by applying the obtained data to the learning model, which will be described below.

The data learning unit 1010 may train a learning model by using a content, and may generate a learning model for estimating an object included in an image. In this case, the content may include at least one of an image and a video.

The data learning unit 1010 may train the learning model by using a content and a type of an object included in the content as training data.

For example, the training data may be an image including a bird or information indicating that the object included in the image is a bird.

The learning model configured to estimate an object included in an image may be one learning model or a combination of a plurality of learning models.

The data recognition unit 1020 may estimate an object included in an image based on various types of feature data (for example, an image, a video, or the like).

The data recognition unit 1020 may estimate an object included in an input image according to a criterion pre-set by learning. The data recognition unit 1020 may use the input image as an input value for the learning model, and may use a user's response to a result of estimating the object included in the image to refine the learning model.

According to an embodiment, the learning model may be a learning model configured to estimate an object included in an image. In this case, the data recognition unit 1020 may estimate the object included in the image by applying the image to the learning model as feature data.

For example, when an image including a person's face is inputted, the data recognition unit 1020 may estimate the person's face according to the learned criterion.

At least one of the data learning unit 1010 and the data recognition unit 1020 may be manufactured in the form of at least one hardware chip, and may be mounted in the electronic device. For example, at least one of the data learning unit 1010 and the data recognition unit 1020 may be manufactured in the form of a hardware chip only for AI, or may be manufactured as a part of an existing generic-purpose processor (for example, a CPU or an application processor) or a graphic-dedicated processor (for example, a GPU), and may be mounted in various types of electronic devices described above.

According to an embodiment, the hardware chip only for AI is a dedicated processor which is specified for probability calculation, and has higher parallel processing performance than an existing generic-purpose processor and thus can rapidly process calculation in the AI field such as machine learning.

The data learning unit 1010 and the data recognition unit 1020 may be mounted in one electronic device, or may be mounted in separate electronic devices, respectively. For example, one of the data learning unit 1010 and the data recognition unit 1020 may be included in the electronic device, and the other one may be included in a server. In addition, model information established by the data learning unit 1010 may be provided to the data recognition unit 1020 wiredly or wirelessly, and data inputted to the data recognition unit 1020 may be provided to the data learning unit 1010 as additional training data wiredly or wirelessly.

At least one of the data learning unit 1010 and the data recognition unit 1020 may be implemented as a software module. When at least one of the data learning unit 1010 and the data recognition unit 1020 is implemented as a software module (or a program module including an instruction), the software module may be stored in a non-transitory computer readable medium. In this case, at least one software module may be provided by an operating system (OS), or a predetermined application. Alternatively, a part of the at least one software module may be provided by the OS, and the other part may be provided by the predetermined application.

The electronic device according to various embodiments may be one of various types of electronic devices. The electronic device may include at least one of, for example, a portable communication device (e.g., a smart phone), a computer device, a portable multimedia device, a portable medical device, a camera, a wearable device, or a home appliance. The electronic device according to an embodiment is not limited to the above-described devices.

It should be appreciated that various embodiments of the present disclosure and the terms used therein are not intended to limit the technological features set forth herein to particular embodiments, and include various changes, equivalents, and/or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and/or B," "A, B, or C," or "at least one of" "A, B, and/or C" may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, the module may be implemented in a form of an application-specific integrated circuit (ASIC).

Various embodiments as set forth herein may be implemented as software (e.g., the program 840) including instructions that are stored in a machine-readable storage medium (e.g., internal memory 836 or external memory 838) that is readable by a machine (e.g., a computer). The machine may invoke an instruction stored in the storage medium, and may be operated according to the instruction invoked, and may include an electronic device (e.g., the electronic device 801) according to disclosed embodiments. When the instruction is executed by a processor (e.g., the processor 820), the processor may execute a function corresponding the instruction directly or using other components under the control of the processor. The instruction may include a code generated or executed by a complier or an interpreter. The machine-readable storage medium may be provided in the form of a non-transitory storage medium. Wherein, the term "non-transitory" simply means that the storage medium is a tangible device, and does not include a signal, but this term does not differentiate between where data is semi-permanently stored in the storage medium and where the data is temporarily stored in the storage medium.

According to an embodiment, a method according to various embodiments of the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed online via an application store (e.g., Play Store™). If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a display including a notch portion formed on at least one edge thereof;
   a processor; and
   a memory configured to store at least one of a position, a size, or a color of a region corresponding to the notch portion, and instructions that, when executed by the processor, cause the processor to:
   identify an image characteristic of a non-display region of an image that is not displayed by the region corresponding to the notch portion when receiving a user command requesting displaying of the image; and
   control the display according to the image characteristic to adjust a region displaying the image and to display the image.

2. The electronic device of claim 1, wherein the image characteristic is at least one of an edge component detection value, a detected object, a detected face, or a color value.

3. The electronic device of claim 2, wherein the memory is configured to store instructions that, when executed by the processor, cause the processor to:
based on at least a part of an object or a face being detected from the non-display region, control the display to display the image by using some region of the display; and
based on at least a part of an object or face not being detected from the non-display region, control the display to display the image by using an entire region of the display.

4. The electronic device of claim 2, wherein the memory is configured to store instructions that, when executed by the processor, cause the processor to:
based on a color of the non-display region being similar to a color of the region corresponding to the notch portion, control the display to display the image by using an entire region of the display; and
based on the color of the non-display region not being similar to the color of the region corresponding to the notch portion, control the display to display the image by using some region of the display.

5. The electronic device of claim 2, wherein the memory is configured to store instructions that, when executed by the processor, cause the processor to:
identify an image characteristic of the non-display region of the image that is not displayed by the region corresponding to the notch portion based on a user command requesting zooming-in of the image displayed on the display being received,
control the display to zoom in on the image, and
control the display, according to the image characteristic, to adjust a region displaying the image that is zoomed in on.

6. The electronic device of claim 5, wherein the memory is configured to store instructions that, when executed by the processor, cause the processor to:
based on detection of at least a part of an object or a face from the non-display region being identified, control the display to zoom-in and display the image by using some region of the display; and
based on detection of at least a part of an object or face from the non-display region not being identified, control the display to zoom-in and display the image by using an entire region of the display.

7. The electronic device of claim 5, wherein the memory is configured to store instructions that, when executed by the processor, cause the processor to:
based on a similarity between a color of the non-display region and a color of the region corresponding to the notch portion being identified, control the display to zoom-in and display the image by using an entire region of the display; and
based on the similarity between the color of the non-display region and the color of the region corresponding to the notch portion not being identified, control the display to zoom-in and display the image by using some region of the display.

8. The electronic device of claim 2, wherein the memory is configured to store instructions that, when executed by the processor, cause the processor to, based on a user command to display a plurality of images comprising a first image and a second image in sequence being received:
identify an image characteristic of a non-display region of the first image that is not displayed by the region corresponding to the notch portion, and
control the display, according to the image characteristic, to adjust a region displaying the plurality of images and to display the plurality of images in sequence.

9. The electronic device of claim 8, wherein the memory is configured to store instructions that, when executed by the processor, cause the processor to:
based on detection of at least a part of an object or face from the non-display region included in the first image being identified, control the display to display the plurality of images in sequence by using some region of the display; and
based on detection of at least a part of an object or face from the non-display region included in the first image not being identified, control the display to display the plurality of images in sequence by using an entire region of the display.

10. The electronic device of claim 8, wherein the memory is configured to store instructions that, when executed by the processor, cause the processor to:
based on a similarity between a color of the non-display region included in the first image and a color of the region corresponding to the notch portion being identified, control the display to display the plurality of images in sequence by using an entire region of the display; and
based on the similarity between the color of the non-display region included in the first image and the color of the region corresponding to the notch portion not being identified, control the display to display the plurality of images in sequence by using a portion of the display.

11. A control method comprising:
receiving a user command requesting displaying of an image;
identifying an image characteristic of a non-display region of the image that is not displayed by a region corresponding to a notch portion;
adjusting a region displaying the image according to the identified image characteristic; and
displaying the image.

12. The control method of claim 11, wherein the image characteristic is at least one of an edge component detection value, a detected object, a detected face, or a color value.

13. The control method of claim 12, wherein the control method comprises:
identifying detection of at least a part of an object or a face from the non-display region;
in response to the at least part of the object or face being detected from the non-display region, displaying the image by using some region of the display; and
in response to the at least part of the object or face not being detected from the non-display region, displaying the image by using an entire region of the display.

14. The control method of claim 12, wherein the control method comprises:
identifying a similarity between a color of the non-display region and a color of the region corresponding to the notch portion;
in response to the similarity between the color of the non-display region and the color of the region corresponding to the notch portion being identified, displaying the image by using an entire region of the display; and in response to the similarity between the color of the non-display region and the color of the region corresponding to the notch portion not being identified, displaying the image by using some region of the display.

15. The control method of claim 12, wherein the control method comprises:
receiving a user command requesting zooming-in and displaying of the image displayed on the display;
identifying the image characteristic of the non-display region of the image that is not displayed by the region corresponding to the notch portion while the image is zoomed-in; and
adjusting a region displaying the zoomed-in image according to the identified image characteristic.

16. The control method of claim 15, wherein the control method comprises:
identifying detection of at least a part of an object or a face from the non-display region;
in response to the at least part of the object or face being detected from the non-display region, zooming-in and displaying the image by using some region of the display; and
in response to the at least part of the object or face not being detected from the non-display region, zooming-in and displaying the image by using an entire region of the display.

17. The control method of claim 15, wherein the control method comprises:
identifying a similarity between a color of the non-display region and a color of the region corresponding to the notch portion;
in response to the similarity between the color of the non-display region and the color of the region corresponding to the notch portion being identified, zooming-in and displaying the image by using an entire region of the display; and
in response to the similarity between the color of the non-display region and the color of the region corresponding to the notch portion not being identified, zooming-in and displaying the image by using some region of the display.

18. The control method of claim 12, wherein the control method comprises:
receiving a user command to display a plurality of images comprising a first image and a second image in sequence;
identifying an image characteristic of a non-display region of the first image that is not displayed by the region corresponding to the notch portion; and
adjusting a region displaying the plurality of images according to the identified image characteristic, and displaying the plurality of images in sequence.

19. The control method of claim 18, wherein the control method comprises:
identifying a similarity between a color of the non-display region and a color of the region corresponding to the notch portion;
in response to the similarity between the color of the non-display region and the color of the region corresponding to the notch portion being identified, displaying the plurality of images in sequence by using an entire region of the display; and
in response to the similarity between the color of the non-display region and the color of the region corresponding to the notch portion not being identified, displaying the plurality of images in sequence by using some region of the display.

20. A computer program product comprising a computer readable recording medium that stores instructions that, when executed by a processor in a computer; causes the processor to:
receive a user command requesting displaying of an image;
identify an image characteristic of a non-display region of the image that is not displayed by a region corresponding to a notch portion; and
adjust a region displaying the image according to the identified image characteristic; and
display the image on a display.

* * * * *